(12) United States Patent
Simonetti et al.

(10) Patent No.: US 6,884,994 B2
(45) Date of Patent: Apr. 26, 2005

(54) HIGH TEMPERATURE SCINTILLATOR

(75) Inventors: John J. Simonetti, Hamilton Square, NJ (US); Wolfgang Peter Ziegler, Hightstown, NJ (US); Edward F. Durner, Jr., Cranbury, NJ (US); Catherine Danielle Marie Busser, Lyons (FR)

(73) Assignee: Schlumberger Technology Corporation, Ridgefield, CT (US)

( * ) Notice: Subject to any disclaimer, the term of this patent is extended or adjusted under 35 U.S.C. 154(b) by 184 days.

(21) Appl. No.: 10/246,978

(22) Filed: Sep. 19, 2002

(65) Prior Publication Data

US 2004/0056186 A1 Mar. 25, 2004

(51) Int. Cl.[7] .................................................. G01V 5/10
(52) U.S. Cl. .............................. 250/269.4; 252/301.17; 523/136
(58) Field of Search .......................... 250/269.4, 484.4, 250/362, 361 R; 252/301.17, 588, 301.18, 582; 523/136

(56) References Cited

U.S. PATENT DOCUMENTS

| 2,745,968 A | 5/1956 | Ludeman .................... 250/71 |
| 3,010,908 A | 11/1961 | Broderick et al. ........ 252/301.2 |
| 3,418,127 A | 12/1968 | Millikan ........................ 96/82 |
| 3,600,445 A | 8/1971 | Wirth et al. ................ 260/613 |

(Continued)

FOREIGN PATENT DOCUMENTS

DE    1 128 140    9/1960    .......... D39C/25/01

OTHER PUBLICATIONS

Bai, F. et al. "Fluorescence and Energy Migration in 4–Vinylbiphenyl Homopolymer and Alternating and Random Copolymers of 4–Vinylbiphenyl with Methyl Methacrylate". *Macromolecules*, 19, pp. 2798–2801 (1986).

(Continued)

*Primary Examiner*—David Porta
*Assistant Examiner*—Faye S. Polyzos
(74) *Attorney, Agent, or Firm*—Wiggin & Dana; Jody Lynn DeStefanis; William B. Batzer

(57) ABSTRACT

The present invention provides scintillation material having good stability at continuous operating temperatures of at least 175° C. The scintillation material includes a cross linked copolymer with improved aromatic character that form a host plastic having properties of a thermoset polymer. The host plastic contains a primary fluorescent agent and a wavelength shifter. Preferably, the copolymer is comprised of a styrene derivative such as, for example, p-t-butylstyrene, and a higher melting point compound such as, for example, 4-vinylbiphenyl. In accordance with one aspect of the present invention, the scintillation material possesses properties of: good mechanical properties at high temperature (e.g., a Tg of about 180° C.); excellent light output (e.g., energy transfer efficiency); high hydrogen content for fast neutron detection; good optical transparency; and stable operation at temperature.

17 Claims, 4 Drawing Sheets

U.S. PATENT DOCUMENTS

| | | | |
|---|---|---|---|
| 3,886,082 A | 5/1975 | Hyman, Jr. | 252/301.2 R |
| 3,898,460 A | 8/1975 | Noakes et al. | 250/328 |
| 4,127,499 A | 11/1978 | Chen et al. | 252/301.17 |
| 4,358,401 A | 11/1982 | O'Brien et al. | 252/628 |
| 4,495,084 A | 1/1985 | Shimizu et al. | 252/301.17 |
| 4,578,213 A | 3/1986 | Simonetti | 252/301.17 |
| 4,713,198 A | 12/1987 | Simonetti | 252/301.17 |
| 4,760,252 A | 7/1988 | Albats et al. | 250/269 |
| 4,833,320 A | 5/1989 | Hurlbut | 250/256 |
| 4,972,082 A | 11/1990 | Loomis et al. | 250/269 |
| 5,110,500 A * | 5/1992 | Walker | 252/301.16 |
| 5,293,410 A | 3/1994 | Chen et al. | 376/108 |
| 5,539,225 A | 7/1996 | Loomis et al. | 250/269.4 |
| 5,606,638 A * | 2/1997 | Tymianski et al. | 385/143 |
| 6,228,286 B1 * | 5/2001 | Leblans et al. | 252/301.4 H |
| 6,495,837 B1 | 12/2002 | Odom et al. | 250/390.11 |

OTHER PUBLICATIONS

Buck, W. L. et al. "Preparation and Performance of Efficient Plastic Scintillators". *Nucleonics*, vol. 11, No. 11, pp. 48–52, (Nov., 1953).

Hurlbut, C. R. "Plastic Scintillators—A Survey" *Bicron*, pp. 1–17 (Nov., 1985).

Malhorta, S. L. et al. "The Thermal Decomposition and Glass Transition Temperature of Poly(p–tert–butylstyrene)". *Sci–Chem*, A15(1), pp., 121–141 (1981).

* cited by examiner

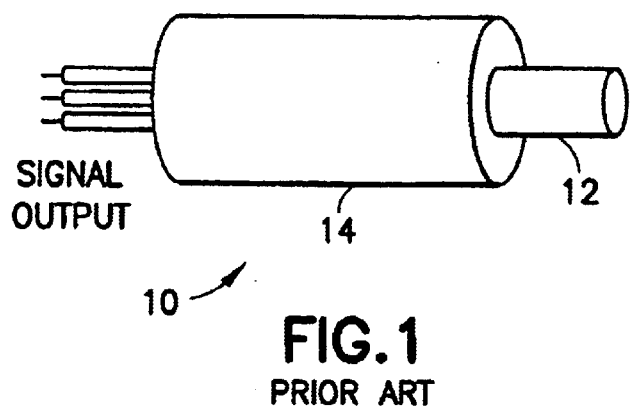
FIG. 1
PRIOR ART
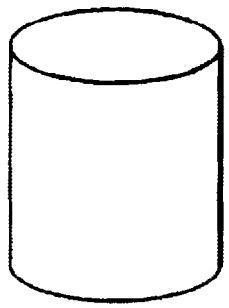 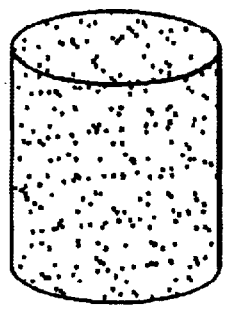 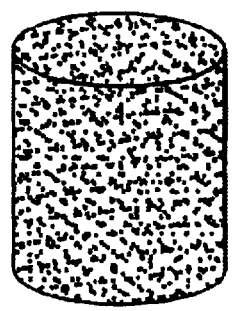 
FIG. 2A　　FIG. 2B　　FIG. 2C　　FIG. 2D

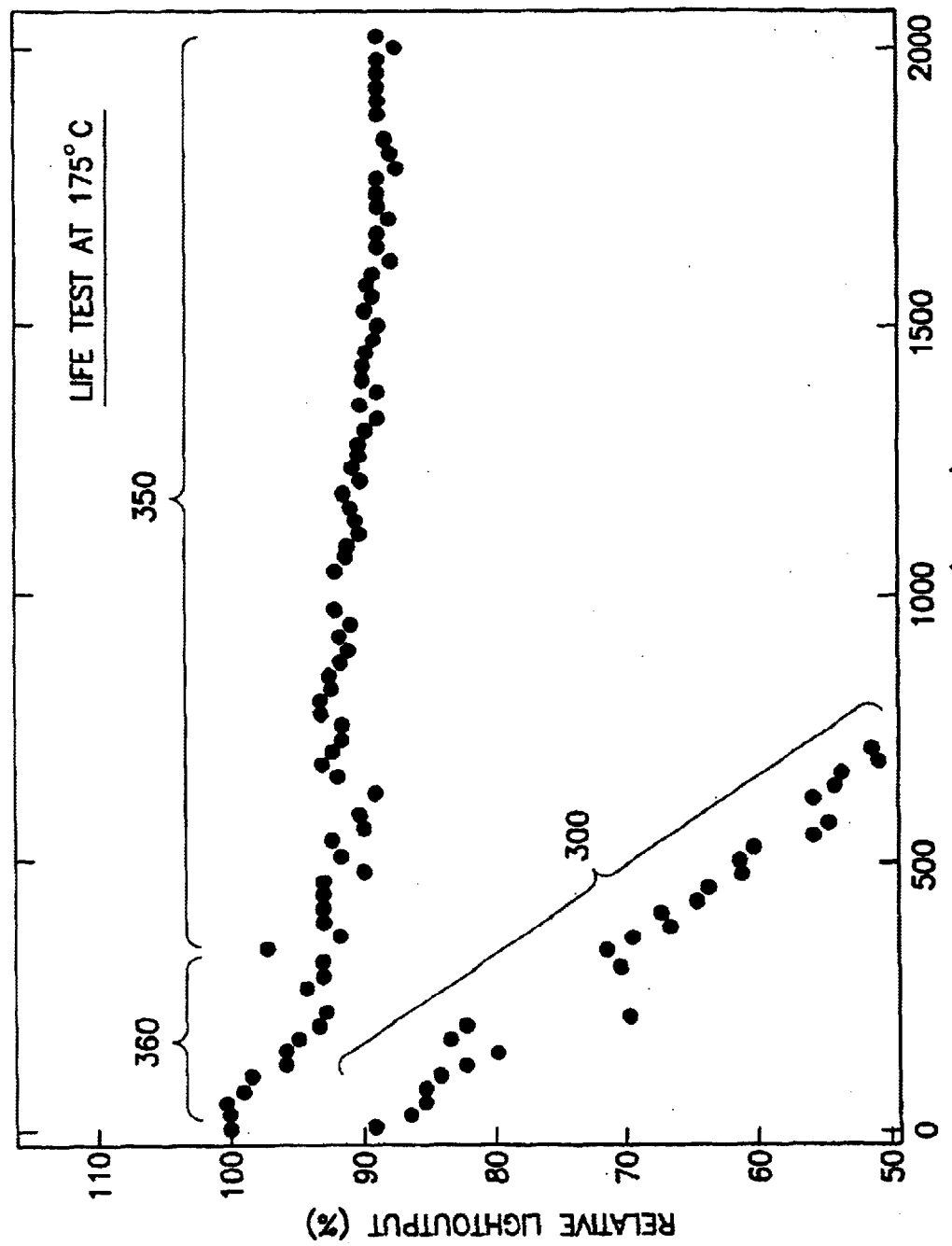

HIGH TEMPERATURE SCINTILLATOR

BACKGROUND OF THE INVENTION

1. Field of the Invention

This invention relates generally to scintillation detector systems and, more particularly, to scintillation material having improved stability at continuously high operating temperatures.

2. Discussion of Related Art

Nuclear radiation has been used for borehole and well analysis, generally referred to as logging. Detecting and measuring radiation permits an evaluation of the properties of a formation surrounding the borehole and therefore, is used for locating and extracting, for example, radioactive mineral deposits and petroleum.

As illustrated in commonly assigned, U.S. Pat. No. 5,293,410, issued Mar. 8, 1994, to Felix K. Chen et al., the disclosure of which is incorporated by reference herein in its entirety, high energy neutron generators are particularly useful in well logging applications. In such applications one important factor is accurate knowledge of the neutron pulses that irradiate the surrounding formation. For example, it is desirable to accurately measure the neutron output (e.g., number of neutrons emitted by the neutron detector). As described by Chen et al., ensuring stable generator output is important for successful implementation of neutron generators in logging applications.

Logging tools typically employ radiation detectors to assist in control of neutron output. Chen et al. and commonly-assigned U.S. Pat. No. 5,539,225, issued Jul. 23, 1996, to William A. Loomis et al., the disclosure of which is hereby incorporated by reference in its entirety, describe drilling apparatus that include neutron detectors. For example, Loomis et al. describe a drill string having a neutron generator, at least one neutron detector (e.g., a scintillation detector), a photodetector optically coupled to the scintillation detector and supporting electronic systems. These components cooperate to process neutron bombardment of the detector such that information is obtained regarding the neutron output of the generator. Such information is provided to control devices for assisting in stable neutron generation. Commonly-assigned U.S. Pat. No. 4,760,252, issued Jul. 26, 1988 to Paul Albats et al., and U.S. Pat. No. 4,972,082, issued Nov. 20, 1990 to William A. Loomis, et al., also incorporated by reference in their entireties, disclose wireline applications having similar neutron detectors.

FIG. 1 illustrates a conventional scintillation detector, shown generally at 10. The scintillation detector 10 is comprised of two basic components. Scintillation material 12 efficiently interacts with incident radiation (e.g., emitted by a neutron generator). The incident energy excites fluorescent materials contained in the scintillation material 12 such that the fluorescent materials give off light (e.g., scintillation light). A second component is a light detector such as a photodetector 14 that converts the scintillation light into an electronic signal. The electronic signal is processed by systems, such as described in Loomis et al., to obtain information related to the neutron output of the neutron generator.

In a conventional logging apparatus, scintillation material is comprised of a specially formulated organic polymer or plastic. The inventors have noted that many conventional plastic scintillators generally do not exhibit acceptable mechanical and optical properties when used at relatively high temperature (in excess of 75° C. and up to, for example, 175° C.) encountered in a borehole. In spite of this perceived deficiency, development of a plastic scintillator for well logging is preferred as plastic scintillators are particularly useful in selectively detecting fast neutrons (e.g., neutrons above about 0.5 MeV energy) that are produced from accelerator based neutron generator in drill strings and sondes. Accelerator based well logging tools are perceived as a very effective and safe means for evaluation of geological formation properties. The inventors have observed that these properties are more exactly quantified when the fast neutron flux is measured during tool operation. Fast neutrons are selectively detected when the neutron impacts a hydrogen atom nucleus in the scintillator. As is generally known, momentum transfer is very efficient for this type of collision since the neutron and proton masses are almost identical. A recoil proton transfers its energy to the hydrogenous plastic matrix by means its electrostatic field. The sensitivity to other types of nuclear radiation is lower and so a high signal-to-noise ratio is achieved for fast neutrons.

Commonly owned, U.S. Pat. No. 4,578,213, issued Mar. 25, 1986 and U.S. Pat. No. 4,713,198, issued Dec. 15, 1987, to John J. Simonetti (the Simonetti Patents), the disclosures of which are incorporated by reference herein in their entireties, each describe a high temperature plastic scintillator comprising a polymethylpentene (PMP) thermoplastic material containing a fluorescent additive. The plastic scintillator is described as maintaining excellent optical properties for detecting neutrons at high temperatures, e.g., as high as 200° C. The Simonetti Patents describe that the PMP thermoplastic material is an improvement over conventional thermosetting plastics such as polystyrene, polyvinyl toluene and various acrylic polymers.

As illustrated by the aforementioned Simonetti Patents, plastic scintillator materials have been available commercially for many years. A comparison of some of the scintillator materials and observed properties is tabulated below in Table 1.

TABLE 1

| Scintillator | Density (g/cc) | Melting/ Softening Point (Tg) ° C. | Light Output (% Anthracene) | Emission (nm) | H/C Ratio (atomic) |
|---|---|---|---|---|---|
| THERMOSCIN | 0.835 | 230 | 18 | 420 | 2.20 |
| BC-438 | 1.032 | 75 | 55 | 425 | 1.00 |

BC-438, a scintillator manufactured by Bicron Business Unit of Saint-Gobain Industrial Ceramics, Inc., Newbury, Ohio, USA, employs polyvinyltoluene (PVT) for a host plastic material. It is believed that the PVT is cross-linked to improve the materials resistance to deformation above room temperature. However, the host polymer has a melting point of only about 75° C. and cannot withstand borehole temperatures. For example, U.S. Pat. No. 4,833,320, issued May 23, 1989, to Charles R. Hurlbut, describes a plastic scintillation element of a scintillation detector that softens and deforms at high operating temperatures (e.g., in borehole applications). Hurlbut describes enclosing the scintillation material in a metal retaining cup for attempting to hold the scintillation material in its original shape during high temperature operation.

The assignee of the present invention has modified PMP, generally considered a high temperature host polymer by those skilled in the art, to provide scintillator properties. The modified PMP is manufactured under the brand name THERMOSCIN. As illustrated in Table 1, the THERMOSCIN is temperature resistant and has a relatively high hydrogen content as compared to conventional scintillation material as illustrated by the BC-438 sample of Table 1. However, the modified PMP is seen to offer low efficiency for generating scintillation pulses. One perceived reason for the low light output is that the PMP host polymer does not have an extended system of π (pi) electronic bonding. This type of organic carbon-carbon bonding is arranged in some molecular forms to be highly delocalized. The delocalization or aromatic character is seen as a key factor for distribution of energy from one location in a polymer to another. PVT based scintillators such as, for example, the aforementioned BC-438 scintillators, have this aromatic character and as a result demonstrate a high light output or high energy transfer efficiency.

U.S. Pat. No. 4,127,499, issued Nov. 28, 1978, to Tseng J. Cheng et al. describe a thin film scintillator composition formed from a latex dispersion manufacturing process. The thin film composition includes fluor concentrations described as providing counting efficiencies for detecting radiation emissions as low as 0.01 MeV. Chen et al. further describe a preferred embodiment where the thin film composition is used as a coating on a photographic support (e.g., glass, metal, film or paper supports) having a coating coverage of 5 to 40 milliliters/100 $cm^2$, and more preferably 10 to 30 ml/100 $cm^2$. A perceived disadvantage of the thin film scintillation materials of Chen et al. is that it is not suited for high temperature operation as experienced in borehole environments.

Accordingly, the inventors have realized that a need exists for improved host polymers that exhibit stable properties at relatively high temperatures (e.g., in excess of at least 175° C.) while also exhibiting improved efficiency for generating scintillation pulses.

OBJECTS OF THE INVENTION

Therefore, it is an object of this invention to provide a scintillation host polymer having stable properties at relatively high operating temperatures (e.g., at least 175° C.) and improved optical properties.

It is another object of this invention to provide an improved scintillator detector for use with a neutron generator in borehole environments.

Further objects of this invention will become more apparent from a consideration of the drawings and ensuing description.

SUMMARY OF THE INVENTION

The present invention provides scintillator material having good stability at continuous operating temperatures of at least 175° C. The scintillation material composition is formulated using a specific copolymer. The addition of certain florescent dyes assists in achieving stable operation for well logging environments. In one embodiment, the scintillator is a practical ruggedized nuclear radiation detector with specific sensitivity for measuring fast neutrons. A fast neutron flux monitor provides useful real time data when used in conjunction with an accelerator type neutron generator device. In accordance with one aspect of the present invention, improved scintillation materials possess properties of: good mechanical properties at high temperature (e.g., a glass transition temperature (Tg) of about 180° C.); excellent light output (e.g., energy transfer efficiency); high hydrogen content for fast neutron detection; good optical transparency; and stable operation at temperature.

In one embodiment, the scintillation material includes a copolymer cross-linked with an aromatic agent to form a host plastic having properties of a thermoset polymer. The host plastic contains a primary fluorescent agent and a wavelength shifter. Preferably, the copolymer is comprised of a styrene derivative such as, for example, p-t-butylstyrene, and vinylbiphenyl. In one embodiment, an aromatic crosslinking agent is divinylbenzene (DVB). Preferably, the primary fluorescent agent is p-terphenyl (PT) and the wavelength shifter is 2,5-bis(4-biphenylyl)-1,3,4-oxadiazole (BBO).

In another aspect of the invention, a method for making a high temperature scintillation material is presented. The method includes providing a host polymer formed of a derivative of styrene, bonding a higher melting point component to the host polymer to form a copolymer, and cross-linking the copolymer using an aromatic compound.

In one embodiment, the method further includes adding an energy transfer dye to the cross-linked copolymer, and adding a wavelength shifter dye such that an emission wavelength of the energy transfer dye matches an absorption wavelength of the wavelength shifter dye to prevent loss of light by self absorption. Preferably, the step of adding the wavelength shifter includes selecting a wavelength shifter dye having an emission spectrum that overlaps a fluorescent response of a photodetector. In one embodiment, the method includes adding one fluorescent dye to the cross-linked copolymer. The one fluorescent dye having an emission spectrum that overlaps a fluorescent response of the photodetector.

In one embodiment, the method includes, prior to the step of bonding, synthesizing and purifying the higher melting point component to remove substantially all detectable impurities, which could interfere with fluorescent efficiency.

In yet another aspect of the present invention, a method is presented for determining the characteristics of an earth formation surrounding a borehole using a tool such as, for example, a sonde for wireline applications or a drill string for logging-while-drilling applications. The method includes providing a neutron generator in the tool for irradiating the earth formation with high energy neutrons, providing a scintillator detector in the tool located in proximity to the neutron generator for detecting neutron output of the neutron generator, and controlling the neutron generator in response to the detected neutron output.

In yet another aspect of the present invention, a drill string and a sonde having the novel plastic scintillator are disclosed.

BRIEF DESCRIPTION OF THE DRAWINGS

The above set forth and other features of the invention are made more apparent in the ensuing Detailed Description of the Preferred Embodiments when read in conjunction with the attached Drawings, wherein:

FIG. 1 illustrates a scintillation detector as known from the prior art;

FIGS. 2A–2D illustrate successive heating of a cylinder of scintillation material, formulated in accordance with the present invention, including a copolymer cross-linked with an aromatic agent from about room temperature to about 300° C.;

FIG. 3 depicts plots of scintillation material performance with and without a p-terphenyl fluorescent agent;

DESCRIPTION OF THE PREFERRED EMBODIMENTS OF THE INVENTION

Figure 4:
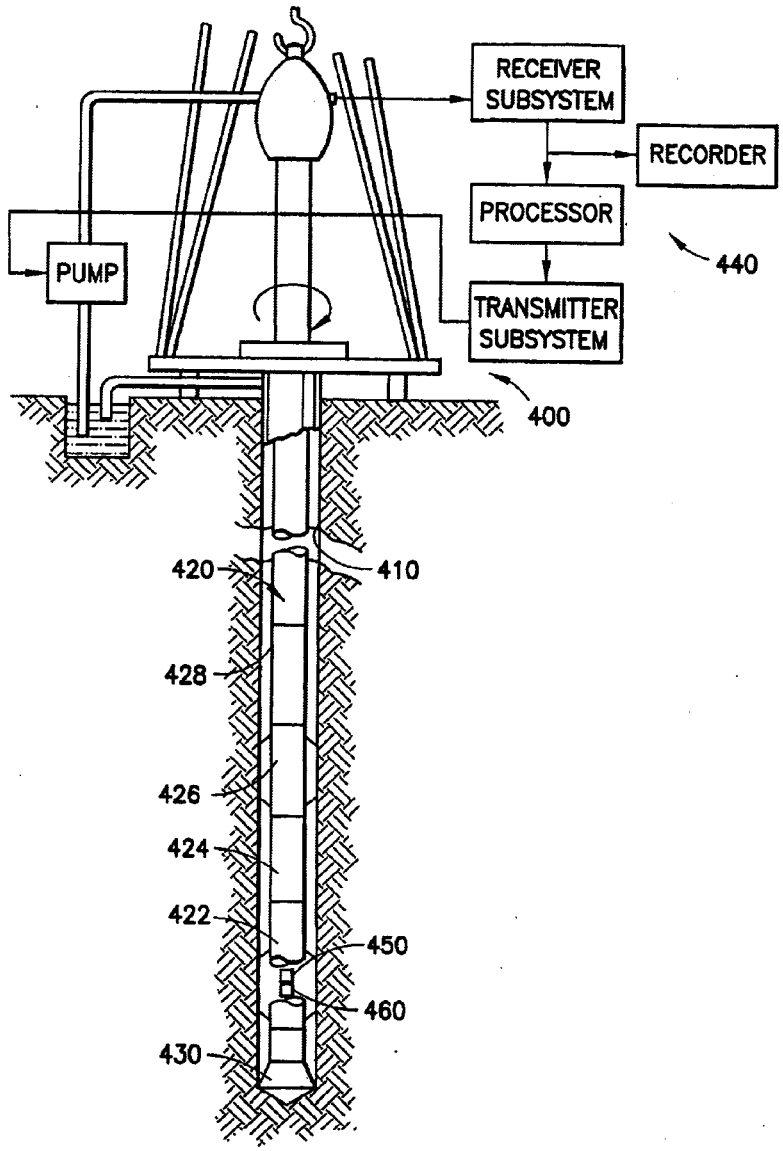
FIG. 4 illustrates a drilling string including a scintillator detector and a neutron generator configured and operating in accordance with one embodiment of the present invention.

In one aspect of the present invention, improvements were made in plastic scintillator materials by modifying the formulation of the materials in response to observation made with respect to the high temperature behavior of the materials. For example, improved formulations are described that correspond to observations made regarding the purity of scintillator components as it relates to scintillator efficiency, fluorescent dye influence on glass transition temperature (Tg), and the behavior and stability of dyes and matrix formulations during conditions that correspond to borehole operating environments.

An improved plastic scintillator material demonstrates good stability at continuous operating temperatures of at least 175° C. The scintillator material is formulated using a copolymer derivative of styrene such as, for example, a monomer of p-t-butylstyrene (PTS), also referred to as 4-1(t-butyl)-vinyl benzene, having a CAS No. 1746-23-2 (a CAS number is a numeric designation given a specific chemical compound by the Chemical Abstract Service). The monomer forms a polymer with a Tg of slightly less than 150° C. As noted in the Background Section of the present disclosure, commercial plastic scintillators based on polymers of vinyltoluene or stryrene soften at about 75° C. Table 2 illustrates plastic scintillator materials based on the use of a polymer formed by PTS, generally referred to as SUPERSCIN. SUPERSCIN has an aromatic character such that a high light output is achieved while also providing a hydrogen/carbon (H/C) ratio (e.g., an atomic ratio) greater than one (1) for improving the selective response for fast neutrons.

TABLE 2

| Scintillator | Density (g/cc) | Melting/ Softening Point (Tg) ° C. | Light Output (% Anthracene) | Emission (nm) | H/C Ratio (atomic) |
|---|---|---|---|---|---|
| DUROSCIN | 0.949 | 180 | 65 | 408 | 1.2 |
| HYPERSCIN | 0.949 | 150 | 55 | 408 | 1.2 |
| SUPERSCIN | 0.949 | 130 | 65 | 408 | 1.33 |

To improve the aromatic character, thermal stability and rigidity of the formed PTS polymer, the inventors added a higher melting point compound such as, for example, 4-vinylbiphenyl (VBP) having a CAS No. 2350-89-2. The resulting copolymer includes two phenyl groups and is very rigid. Additionally, the PTS-VBP copolymer has improved aromatic character over conventional PMP formulations.

The inventors achieved further performance improvements using the PTS-VBP copolymer properties as starting point. The inventors cross-linked the PTS-VBP copolymer with an aromatic stabilizing agent such as, for example, divinylbenzene (DVB) having a CAS No. 1321-74-0, to form what is referred to herein as DUROSCIN. DUROSCIN has an increased Tg and improved stability at high temperatures. In fact, the resulting plastic is converted from a thermoplastic to a thermosetting plastic. Thermoset polymers have covalent bonds linking the polymer chains in three dimensions. These links prevent the chains from sliding past one another resulting in a higher modulus and improved creep resistance. In contrast to thermoplastic polymers, thermoset polymers (such as DUROSCIN) cannot be melted and are more difficult to dissolve in an appropriate solvent. The preferred cross-linking component, DVB, makes more than two bonds with the other components, e.g., makes three-dimensional material. Additionally, DUROSCIN has improved optical properties (e.g., improved fluorescence). In accordance with the present invention, scintillation materials formed of DUROSCIN have improved thermomechanical properties, good optical and energy transfer characteristics as compared to conventional materials such as the above described SUPERSCIN material.

The inventors have noted that high temperature applications can benefit greatly by the use of polymers that do not melt. For example, the inventors successively heated a cylinder of the cross-linked PTS-VBP polymer (e.g., DUROSCIN) from room temperature to about 300° C. The results are shown in FIGS. 2A–2D, where FIG. 2A illustrates an initial state of a cylinder 50, FIG. 2B illustrates the cylinder 50 after one hour of heating at 250° C., FIG. 2C illustrates the cylinder 50 after one hour of heating at 280° C., and FIG. 2D illustrates the cylinder 50 after one hour of heating at 300° C. As shown in these figures, discoloration of the cylinder 50 is apparent in successive heating steps due to extensive oxidation. However, the cylinder 50 did not change from its initial cylindrical geometry. It should be appreciated that oxidation of the cylinder 50 can be avoided by appropriate encapsulation, as is known to those skilled in the art.

Fluorescent dyes that can efficiently convert incident radiation to light are typically added to plastic scintillators. By evaluating a number of different organic luminescent materials the inventors discovered a more efficient plastic scintillator. The inventors found that adding small amounts of a dye as a solute increases the luminescent efficiency of a scintillation material. The inventors identified a combination of a primary and a secondary dye to produce a more efficient scintillator. Generally, the primary dye is referred to as an energy transfer compound and the secondary dye serves as a "wavelength shifter." The wavelength shifter functions to absorb energy produced by the primary scintillant and radiates it at a longer wavelength so as to match the response characteristics of a photodetector. For example, the shift in the emission spectrum is useful for more closely matching the spectral sensitivity of a photodetector and/or to minimize bulk self-absorption in the plastic scintillator.

The inventors selected two dyes, a primary dye and a secondary dye, such that the emission wavelength of the primary dye matches the absorption wave length of the secondary dye to avoid as much as possible the loss of light inside the plastic material by self absorption. In one embodiment, a primary dye is comprised of p-terphenyl (PT) having a CAS No. 92-94-4, and a secondary dye is comprised of 2,5-bis(4-biphenylyl)-1,3,4-oxadiazole (BBO) having a CAS No. 2043-06-3. The inventors have discovered that the addition of PT improves the Tg of the scintillation material. The inventors have also discovered that the dye compounds have numerous double bonds, hence a lot of $\pi$-electrons and aromatic stability. It should be appreciated that a broad number of organic compounds are suitable dyes. For example, the aforementioned Simonetti Patents describe a number of organic compounds that may be combined to form suitable dyes.

One perceived problem with commercial scintillators is that dyes are known to migrate out of the scintillator over time. The inventors have observed that the migration process is highly accelerated as the temperature is increased. The migration of the fluorescent dyes has been linked to degradation of nuclear performance. Accordingly, the present invention includes several advancements in the selection of dyes for scintillation materials that not only improved stability as a function of time and temperature but also have a beneficial effect on the thermal properties of the scintillator. As described above, there are usually at least two different dye compounds (a primary and a secondary dye) used in a plastic scintillator formulation. In accordance with the present invention, these dyes are added to efficiently convert the incident energy from incident radiation to light.

A preferred formulation of a DUROSCIN scintillator contains two dye components. The primary dye is employed to remove energy directly from the host polymer. In the DUROSCIN scintillator formulation the primary dye (e.g., PT) may not be chemically bonded to the host polymer, however it is very stable as a solute in the host polymer (e.g., PTS, VBP and DVB). In addition, the host polymer contains a component (e.g. VBP) which is an integral part of the host polymer by chemical bonding. The VBP component acts as a fluorescent dye as well as part of the host polymer. A secondary dye (e.g., BBO) is then added as a wavelength shifter. The secondary dye or wavelength shifter is selected such that its optical absorption band overlaps the optical emission spectrum of the primary dye(s). The dye concentrations are usually decreased in the order of primary dye and secondary dye. Since the emission of the plastic scintillator is determined by the fluorescence of the wavelength shifter dye, this compound is selected to have an emission spectrum that strongly overlaps with the response of the photodetector. For example, a compound having a strongly overlapping emission spectrum is one with nuclear properties sufficient to identify a neutron signal over background noise.

In one embodiment, the DUROSCIN scintillator is synthesized using three reactive monomers. The monomer in highest concentration is PTS as already noted. A higher melting point compound, for example, VBP, is also introduced as a pure solid. Preferably, the VBP is synthesized and purified so as to remove all detectable fluorescent impurities. In one embodiment, the VBP concentration range is from about 0% to about 30% by weight. A cross-linking agent (e.g., DVB) is also added at a concentration of from about 0% to about 50% by weight.

Generally speaking, purity of each agent is important. In particular, the inventors have found that the cross-linking agent's purity should be of the highest available. The inventors have realized that a higher luminescent efficiency and best thermal properties are obtained when the monomer and all the matrix components are purified to eliminate impurities. Purification is generally carried out by extraction of undesirable components before use. For example, oxygen is removed before polymerization. Purification is confirmed using ultraviolet excited fluorescence spectroscopy.

A minimum DVB purity of about eighty percent (80%) is preferred. A preferred formulation of the DUROSCIN host polymer is described in Table 3.

TABLE 3

| Component Name | Abbreviation | Composition Range | Preferred Formulation |
|---|---|---|---|
| p-t-butystyrene | PTS | Balance | Balance |
| 4-vinylbiphenyl | VBP | 0% to 10% | 10% |
| divinylbenzene | DVB | 0% to 50% | 20% |

A preferred formulation of DUROSCIN scintillation material is described in Table 4.

TABLE 4

| Composition | Component Name | Abbrev | Formulation Ranges | Preferred Formulation |
|---|---|---|---|---|
| Host Polymer | p-t-butystyrene CAS: 1746-23-2 | PTS | Balance | Balance |
| Host Polymer | 4-vinylbiphenyl CAS: 2350-89-2 | VBP | 0% to 30% | 10% |
| Host Polymer | divinylbenzene CAS: 1321-74-0 | DVB | 0% to 50% | 20% |
| Primary Dye | p-terphenyl CAS: 92-94-4 | PT | 0% to 5% | 2% |
| Wavelength Shifter | 2,5-bis(4-biphenylyl-1,3,4-oxadiazole CAS: 2043-06-3 | BBO | 0.001% to 1% | 0.1% |

In one embodiment, the inventors have discovered that scintillation material having a volume of at least a one millimeter (1 mm), and preferably at least four millimeters (4 mm), is effective for use within a scintillation detector employed in borehole environments. In one embodiment, bulk polymerization allows for the formulation of machinable shapes having dimensions of about one millimeter (1 mm) per side of a three-dimensional geometric solid. The formed parts may be arranged as parts of a larger structure. While Table 4 depicts one embodiment of a DUROSCIN formulation having two fluorescent dyes (e.g., PT and BBO), it should be appreciated that it is within the scope of the present invention for a DUROSCIN formulation to contain one fluorescent dye having an emission spectrum that strongly overlaps with the response of the photodetector. As noted above, a compound having a strongly overlapping emission spectrum is one with nuclear properties sufficient to identify a neutron signal over background noise (e.g., a signal-to-noise ratio that is detectable over noise).

Exemplary Process of Preparing Scintillator Composition

A PTS monomer (as received) is inhibited with a hindered phenol. This free radical scavenger is removed by passing the monomer in a liquid state through a column of activated alumina. Preferably, a first bed volume of monomer is collected and discarded since it has been found that this material contains impurities that cause optical interference with scintillator function. A cross-linking agent (e.g., DVB) is prepared in the same manner. VBP is a solid at room temperature and is prepared to eliminate all optically harmful impurities. It contains no inhibitor and is maintained at low temperatures until use. After purification all reactive components are examined using ultraviolet excited fluorescence. The presence of only the pure monomer fluorescence indicates the suitability of the monomer. It is also possible to accomplish purification by vacuum distillation and sublimation, as is known in the art.

After monomer preparation and analysis the monomer is poured directly into glass vials, which are scrupulously cleaned previously. In one embodiment, the glass vials are already charged with a mixture of fluorophores, which have been carefully weighed. In one embodiment, the fluorescent dyes consist of one or more of the following compound types: naphthalenes, anthracenes, p-terphenyls, oxazoles, oxadiazoles, styrls, substituted butadiens and stilbenes. Other aromatic or unsaturated organic fluorophores known to be useful for the production of plastic scintillators can also be employed.

Preferred formulations which have demonstrated good results are: 2% 2(biphenylyl-5-phenyl-1,3,4-oxadiazole (PBD) plus 0.1% 2,5-bis(4-biphenylyl-1,3,4-oxadiazole (BBO); or 2% 2,5-diphenyloxazole (PPO) plus 0.1% 1,4-bis(5-phenyl-2-oxazolyl)benzene (POPOP). A preferred formulation showing the high temperature properties is 2% p-terphenyl (PT) and 0.1% 2-(4-biphenylyl)-6-phenylbenzoxazole (PBBO). In one embodiment, an effective alternative to the PBBO is 2-(1-naphthyl)-5-phenyloxazole ($\alpha$NPO). It should be appreciated that the formulation mixtures are in weight percent of the monomer content for a given vial.

The mixture is then outgassed on a glass vacuum manifold using at least two freeze thaw cycles. Removal of all dissolved oxygen is important for allowing the polymerization to proceed efficiently. This outgassing is followed by careful backfilling with pure inert gas. Dry nitrogen is found adequate for this purpose. The vial is then sealed off. The sealed vial is placed in a heated chamber, preferably an oil bath, and the temperature is increased gradually. Solution of the fluorescent dyes is achieved by alternate heating and mixing during the initial heating. A stepwise temperature cycle over a period of about two weeks is then carried out.

For example, the inventors have discovered that the following thermal polymerization cycle yields satisfactory results.

1. 20 hours at 80° C.;
2. 48 hours at 100° C.;
3. 32 hours at 125° C.;
4. 24 hours at 132° C.;
5. 48 hours at 150° C.;
6. 72 hours at 175° C.;
7. 12 hours at 168° C.;
8. 12 hours at 150° C.;
9. 12 hours at 145° C.;
10. 12 hours at 140° C.;
11. 12 hours at 135° C.;
12. 12 hours at 130° C.;
13. 12 hours at 125° C.;
14. 24 hours at 120° C.; and
15. 8 hours at 50° C.

The cycle includes temperatures of up to 175° C. and a six day cycle of 150° C. or higher. The temperature cycle is designed to induce a complete and controlled thermal polymerization. This polymerization is indicated by dramatic increases in the viscosity of the solutions. A slow cooling to ambient temperature completes the temperature cycle. This extended cooling cycle is accompanied by the separation of the polymer from the walls of the glass container, e.g., the slow cooling process also solid plastic forms to separate form the container with minimal damage (no cracks or crazing).

As described above, scintillator formulations containing PT are generally preferred. It has been found that formulations containing PT as a primary dye exhibit a measurably higher Tg. It was also demonstrated that the PT-based dye combinations had superior nuclear stability over long periods of time at high temperature. For example, FIG. 3 depicts two plots of a two thousand hour test of scintillation material at 175° C. As shown, FIG. 3 includes a plot of light output for a scintillator sample that does not contain PT, shown generally at 300, and a plot of light output of a scintillator sample containing PT dye formulations, shown generally at 350. After an initial settling, shown generally at 360, permanent degradation of the scintillator material including PT is only about five percent (5%) to ten percent (10%) over the two thousand hour test period.

Exemplary Implementation of the Present Invention

As shown in FIG. 4, a platform and derrick 400 are positioned over a borehole 410 that is formed in the earth by, for example, rotary drilling. A drill string 420 is suspended within the borehole 410 and includes a drill bit 430 at its lower end. As is known in the art, the drill string 420 includes a plurality of sections such as drill collar sections 422 and 426 and stabilizer collar sections 424 and 428. The arrangement of the plurality of drill collar and stabilizer collar sections being adapted to drilling conditions.

In one embodiment of the present invention such as in a measurement-while-drilling application, one or more of the sections 422 through 428 include subassemblies for making measurements, processing, storing and communicating information to components, shown generally at 440, at the earth's surface. Suitable components are described in the aforementioned commonly-assigned, U.S. patent to William A. Loomis et al. (e.g., U.S. Pat. No. 5,539,225). The components 440 cooperate to process the information received from the measurement equipment in the borehole to assist in controlling the drill bit 430 and/or a neutron generator (as described below).

In accordance with the present invention, at least one of the sections 422 and 428 (e.g., section 422) includes a neutron generator 450 and a scintillation detector 460 (including the inventive scintillation material formulation) for detecting the neutron output of the generator 450. In one embodiment, the scintillation detector is coupled to a control device for controlling the neutron generator in response to the detected neutron output to provide stable neutron generation. For example, the scintillation detector may be coupled to a power supply for varying the voltage and/or current supplied to the neutron generator.

Figure 5:
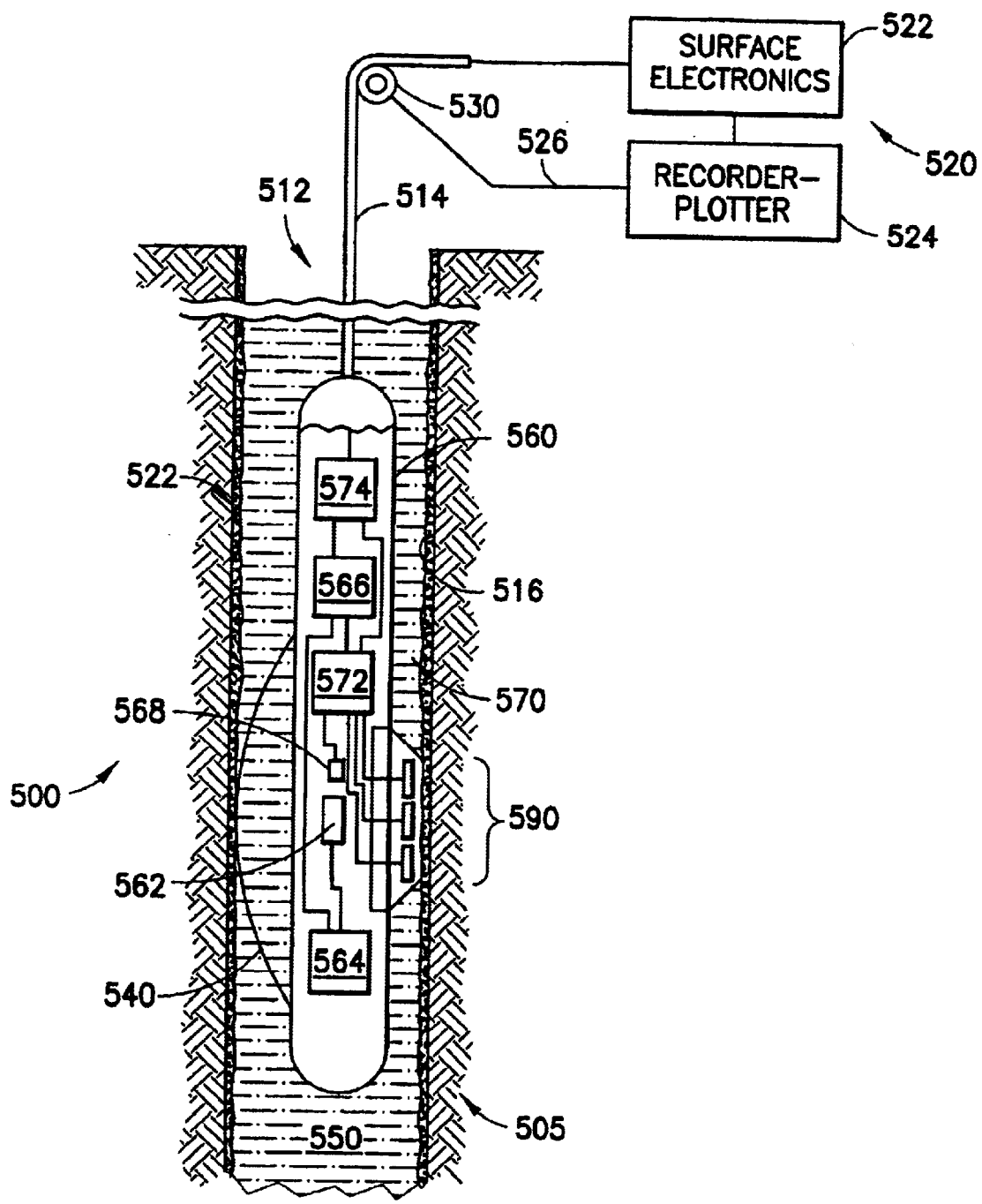
FIG. 5 illustrates a sonde including a scintillator detector and a neutron generator configured and operating in accordance with another embodiment of the present invention.

FIG. 5 illustrates a well logging tool, shown generally at 500, including a downhole sonde 510 suspended in a borehole 512 by an armored cable 514. The cable 514 connects the downhole sonde 510 to surface equipment, shown generally at 520, including a surface electronics package 522 comprising, for example, a truck or skid-mounted digital computer and associated peripherals and a recorder-plotter 524 for making visual and/or magnetic record of the measured parameters vs. depth in the well bore, as is known in the art. For that purpose, the recorder/plotter 524 is electrically or mechanically coupled, as indicated schematically by the line 526, to a cable-following sheave wheel 530.

The sonde 510 may be a sidewall tool and therefore, a bow spring 540 or other decentralizing device is provided to urge the sonde 510 against a sidewall 516 of the borehole 512. The borehole 512 is illustrated as an open hole containing, for example, a fluid 550 and having a mud cake, shown generally at 552, formed on the walls of the borehole 512. It should be appreciated that the aforementioned tools (e.g., the drill string 420 and sonde 510) may be used in open-hole and in cased hole applications.

The sonde 510 includes a pressure and temperature resistant housing 560 which includes, preferably adjacent the lower end thereof, a neutron generator 562 and an associated control and high-voltage power supply section 564. Signals for controlling the operation of the neutron generator 562 (as described above) and high-voltage section 564 are transmitted to those units from a sonde programmer section 566, as is described more fully hereinafter.

A detector array, shown generally at 570, measures the die-away of the epithermal neutron population in an earth formation, shown generally at 505, surrounding the well bore 512. The detector array 570 is located opposite the neutron generator 562, e.g., at substantially the same longitudinal position along the length of the sonde 510. Such close spacing of the detector array 570 to the neutron generator 562 significantly enhances detector count statistics compared to the prior art practice of spacing the detectors from the neutron generator along the length of the sonde. For purposes of the present invention, the neutron generator 562 and detector array 570 are preferably located at the same or approximately the same longitudinal position in the sonde 510, however, it should be appreciated that it is within the scope of the present invention to separate these components longitudinally if desired.

In addition to the detector array 570, a neutron source monitor 568 is located in close proximity to the neutron generator 562, so as to be responsive primarily to high energy neutrons incident directly thereon from the source (e.g., generator 562) rather than to lower energy, scattered neutrons or gamma rays. In accordance with the present invention, the neutron source monitor 568 includes a scintillator comprised of the inventive scintillation material as disclosed in detail above. The output pulses produced by the detector array 570 and the source monitor 568 are supplied to an electronics section 572 where they are amplified and digitized for application to the telemetry section 574 for transmission over the cable 514 to the surface electronics package 522.

It should be appreciated that while FIGS. 4 and 5 describe use of the inventive scintillation material to detect radiation emissions from the neutron generators (e.g., detectors 460 and 568 for detecting emissions of generators 460 and 562, respectively), in one embodiment, the detectors selectively detect fast neutrons (e.g., neutrons above about 0.5 MeV energy) returning from the formation surrounding the boreholes 410 and 512, respectively.

The embodiments of FIGS. 4 and 5 are provided for exemplary purposes and are intended to be non-limiting. One skilled in the art would recognize that other drill string and sonde configurations may be suitably employed.

While the invention has been particularly shown and described with respect to preferred embodiments thereof, it will be understood by those skilled in the art that changes in form and details may be made without departing from the scope and spirit of the invention.

What is claimed is:

1. A scintillator comprising a copolymer cross-linked with an aromatic agent to form a host polymer having properties of a thermoset, said host polymer containing a primary fluorescent agent and a wavelength shifter.

2. The scintillator as set forth in claim 1 wherein said copolymer is comprised of a styrene derivative and a higher melting point compound.

3. The scintillator as set forth in claim 2 wherein said styrene derivative is comprised of p-t-butylstyrene.

4. The scintillator as set forth in claim 2 wherein said higher melting point compound is comprised of 4-vinylbiphenyl.

5. The scintillator as set forth in claim 4 wherein said 4-vinylbiphenyl is substantially free of fluorescent impurities.

6. The scintillator as set forth in claim 4 wherein said 4-vinylbiphenyl is synthesized and purified.

7. The scintillator as set forth in claim 1 wherein said aromatic cross-linking agent is comprised of divinylbenzene.

8. The scintillator as set forth in claim 1 wherein said aromatic cross-linking agent is comprised of divinylbenzene having a purity of at least about 80%.

9. The scintillator as set forth in claim 1 wherein said host polymer is comprised of from about 0% to about 30% by weight of 4-vinylbiphenyl, from about 0% to about 50 by weight of divinylbenzene and the balance p-t-butylstyrene.

10. The scintillator as set forth in claim 1 wherein said host polymer is comprised of about 70% p-t-butylstyrene, about 10% 4-vinylbiphenyl and about 20% divinylbenzene.

11. The scintillator as set forth in claim 1 wherein said primary fluorescent agent is comprised of p-terphenyl.

12. The scintillator as set forth in claim 1 wherein said wavelength shifter is comprised of 2,5-bis(4-biphenylyl)-1,3,4-oxadiazole.

13. The scintillator as set forth in claim 1 wherein said host polymer is comprised of from about 0% to about 30% by weight of vinylbiphenyl, from about 0% to about 50% by weight of divinylbenzene, from about 0% to about 5% by weight of p-terphenyl, from about 0.001% to about 1% of 2,5-bis(4-biphenylyl)-1,3,4-oxadiazole and the balance p-t-butylstyrene.

14. An apparatus for determining the characteristics of a formation surrounding a borehole, comprising:

a sonde having an elongated housing, adapted to be lowered into and moved through the borehole;

a neutron source;

at least one scintillation detector for measuring neutron output of said neutron source, said at least one scintillation detector having a scintillator comprised of a copolymer cross-linked with an aromatic agent to form a host polymer having properties of a thermoset, said host polymer containing a primary fluorescent agent and a wavelength shifter; and signal processing means coupled to said at least one scintillation detector;

wherein said at least one scintillation detector and said signal processing means cooperate to measure neutrons propagated from the source.

15. The apparatus of claim 14, wherein said at least one scintillation detector and said signal processing means further cooperate to control said neutron source in response to said measured neutron output.

16. An apparatus for determining the characteristics of a formation surrounding a borehole, comprising:

an elongated drill collar on a drill string;

a neutron source;

at least one scintillation detector for measuring neutron output of said neutron source, said at least one scintillation detector having a scintillator comprised of a copolymer cross-linked with an aromatic agent to form a host polymer having properties of a thermoset, said host polymer containing a primary fluorescent agent and a wavelength shifter; and signal processing means coupled to said at least one scintillation detector;

wherein said at least one scintillation detector and said signal processing means cooperate to measure neutrons propagated from the source.

17. The apparatus of claim 16, wherein said at least one scintillation detector and said signal processing means further cooperate to control said neutron source in response to said measured neutron output.

* * * * *